Patented May 29, 1934

1,961,073

UNITED STATES PATENT OFFICE 1,961,073

MANUFACTURE OF POTASSIUM BORATE

Alfred Newman, Tompkinsville, N. Y., assignor to Pacific Coast Borax Company, New York, N. Y., a corporation of Nevada No Drawing. Application September 19, 1928, Serial No. 307,066

1 Claim. (Cl. 23—59)

This invention relates to the manufacture of potassium borate.

Potassium borate has hitherto been a relatively unimportant chemical, and the methods of making it expensive.

Among the objects of the present invention is the production of potassium borate utilizing comparatively cheap materials and relatively simple methods of treatment, with consequent low production costs.

Other and further objects and advantages will appear from the more detailed description set forth below, it being understood, however, that this more detailed description is given by way of illustration, only, and not by way of limitation, since various changes may be made therein by those skilled in the art, without departing from the spirit and scope of this invention.

Primarily, in accordance with this invention, a potassium borate is produced from sodium borates by double decomposition with potassium salts. For illustrative purposes there will be given the production of a potassium penta-borate, which from the standpoint of the boron atom alone may be called decaborate, that is a potassium borate containing one molecule of potassium oxide ($K_2O$) and five molecules of boron oxide ($B_2O_3$) and eight molecules of water of crystallization, and corresponding with the formula $K_2O.5B_2O_3.8H_2O$.

For example, borax ($Na_2B_4O_7.10H_2O$) is added to water and treated with a sufficient quantity of sulphuric acid to produce sodium sulphate and sodium pentaborate, defining sodium pentaborate as one molecule of sodium oxide ($Na_2O$) and five molecules of boron oxide ($B_2O_3$). During this treatment the materials may be heated if desired, but the application of heat is not essential.

To the resulting solution potassium chloride may be added either in the solid form or dissolved in water or mother liquor in quantity chemically equivalent to the sodium oxide present in solution as sodium pentaborate.

The following equation may be taken as a formulation of the reactions involved:

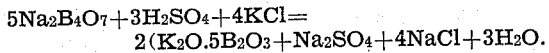

The resultant solution may be filtered, and the potassium pentaborate then crystallized therefrom, with cooling if necessary. The crystallized salt may be separated from the mother liquor by any suitable means, as by centrifuging, and the crystals washed as with water, to remove soluble impurities. Both the mother liquor and the washings may be returned to the process if desired, by utilizing them in lieu of water for forming the solution of sodium borate, of potassium chloride, etc.

While a process involving the reaction formulated above may be used, it has been found preferable to crystallize the potassium compound from a solution containing more boric acid than corresponds with the formula of the penta-borate. For example, borax and water may be treated with a sufficient quantity of sulphuric acid to form sodium oxide and boric oxide in solution in the ratio of one molecule of sodium oxide to six molecules of boron oxide. To the resulting solution potassium chloride may be added either in solid form or dissolved in water or mother liquor in quantity chemically equivalent to the sodium oxide existing as pentaborate. In this case the reaction involved may be formulated as follows:

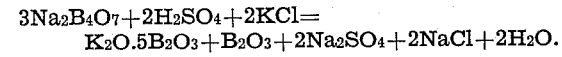

In place of simultaneously reacting the ingredients, the solution of sodium borate after treatment with acid, may be filtered prior to the addition of the potassium chloride, and after filtration, solid potassium chloride or this salt dissolved in water or mother liquor may be added to the filtered solution.

Any suitable sodium borate may be used, such as the naturally occurring mineral known as Rasorite or Kernite, or natural borax known as tincal, or other natural or artificial sodium borates, either in pure or impure condition, such as sodium metaborate ($Na_2O.B_2O_3$), or sodium pentaborate, or other borates having more or less sodium oxide and boron oxide than borax.

In place of potassium chloride other potassium salts such as the sulphate or nitrate, etc., may be used, and the sulphuric acid may be replaced by other suitable acids, such as hydrochloric, nitric, boric, etc.

In producing the potassium pentaborate in accordance with the present invention, as pointed out above, the compound may be recovered from a solution containing more boron oxide than corresponds with the pentaborate ratio, and it is noted that considerable latitude is permissible in this connection. For example, potassium pentaborate may be crystallized from a solution containing a ratio of alkali to boric oxide of between approximately 1 to 3 and 1 to 10. While the best recovery has been made with a ratio of from 1 to 6, the invention is not confined thereto, since the desired compound will form with both lower and higher ratios.

In the processes specifically described above, the addition of the potassium salt such as potassium chloride in chemically equivalent quantity has been indicated. However, the process is obviously not limited to the use of the potassium salt in that proportion.

Further, it may be noted that it is not necessary to form the sodium pentaborate or related compound in the solution before adding the potassium salt, as the desired potassium pentaborate may be recovered from a solution of the reacting materials present in amounts sufficient to form the potassium pentaborate during the recovery step.

It is a surprising and noteworthy discovery that potassium pentaborate could be produced which being relatively insoluble under the given conditions, would separate from the solutions. This property strikingly differentiates the potassium compound from the corresponding sodium and ammonium pentaborates.

And this property may be desirably employed in the recovery of potash values from solutions or brines such as natural brines. For example, brines such as those occurring at Searles Lake and other places may be treated with boric acid to convert the potash present into the pentaborate derivative which may be separated from the solution. Partial carbonation of the brine prior to addition of the boric acid, reduces the amount of the latter that is required. In lieu of boric acid, mixtures of borax and sulphuric acid can of course be used, and such additions may be made to any natural or artificial brines or solutions containing potassium salts and from which the potash is to be recovered.

Having thus set forth my invention, I claim:

A process of producing potassium pentaborate which comprises heating a sodium borate in acid solution with an inorganic potassium salt in proportions to yield a composition containing the potassium and boron compounds present calculated as potassium oxide and boric oxide in the ratio of between 1:6 and 1:10, to form potassium pentaborate, and separating potassium pentaborate from the reaction product.

ALFRED NEWMAN.